Feb. 16, 1954          N. W. HAMMAREN          2,669,092
GAS TURBINE POWER PLANT WITH EXHAUST GAS RECYCLING
Filed Feb. 3, 1953
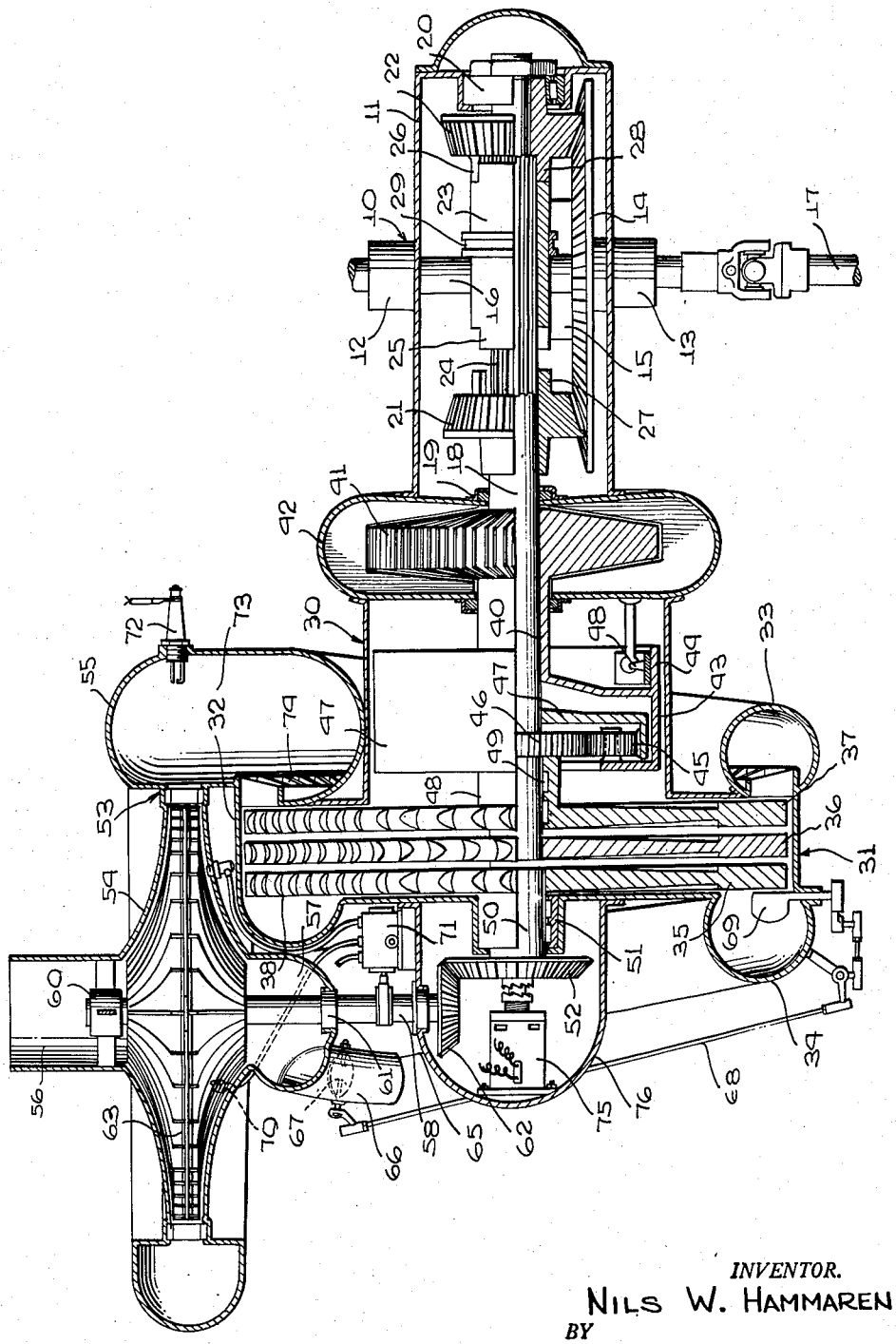
INVENTOR.
NILS W. HAMMAREN
BY
*McMorrow, Berman & Davidson*
ATTORNEYS Patented Feb. 16, 1954

2,669,092

UNITED STATES PATENT OFFICE 2,669,092

GAS TURBINE POWER PLANT WITH EXHAUST GAS RECYCLING

Nils W. Hammaren, Mineola, N. Y.

Application February 3, 1953, Serial No. 334,780

4 Claims. (Cl. 60—39.16)

This invention relates to gas turbine drives for automobiles and more particularly to a unitary drive assembly including a gas turbine power plant and a differential mechanism.

It is among the objects of the invention to provide a gas turbine drive assembly for an automobile which includes a gas turbine power plant and a differential mechanism directly coupled together; which includes a supercharger unit and a turbine unit closely coupled together and a by-pass feeding a portion of the exhaust gas from the turbine back through the supercharger in a regenerative cycle for maximum efficiency of the power plant; which positions the fuel injection nozzles of the power plant in an exhaust gas stream which is mixed with combustion air only at a location spaced from the nozzles so that the fuel is carried from the nozzles in an unburned condition and the nozzles are maintained clean and free from clogging; which has the supercharger scroll housing and the turbine inlet scroll housing disposed substantially at right angles to each other and directly interconnected for efficient transfer of the air and fuel from the supercharger to the turbine inlet; which has separate turbine rotors for driving the automobile at at least two different speeds and for driving the supercharger so that the supercharger can be kept in operation at its own speed regardless of the speed of the automobile; and which is simple and durable in construction, and efficient and effective in operation.

Other objects and advantages will become apparent from a consideration of the following description and the appended claims in conjunction with the accompanying drawing, wherein: The single figure is a diagrammatic cross sectional view of a combined gas turbine power plant and differential mechanism illustrative of the invention.

With continued reference to the drawing, the differential mechanism, generally indicated at 10, includes a gear housing 11 and bearing housings 12 and 13 extending from respectively opposite sides of the gear housing 11 coaxially of each other to support the inner ends of drive shafts 16 and 17 which connect the differential through suitable universal joints to the independently sprung driving wheels of the vehicle. A ring gear 14 is journaled in the gear housing 11 and carries the differential spider gear assembly 15 and axles 16 and 17 extend through the axle housings 12 and 13 and into the spider gear assembly 15 to which they are connected in a manner well known to the art for differential rotation by the ring gear 14.

A drive shaft 18 extends through the gear housing 11 and is journaled in the housing at opposite ends of the housing by bearings 19 and 20 and pinion gears 21 and 22 are rotatably mounted on the drive shaft 18 one at the forward side and one at the rearward side of the rotational axis of the axles 16 and 17 and mesh with the ring gear 14, the pinion 21 being effective to impart a forward driving rotation to the ring gear and the pinion gear 22 being effective to impart a reverse driving rotation to the ring gear. A clutch sleeve 23 is slidably mounted on the drive shaft 18 between the pinion gears 21 and 22 and is drivingly connected to the drive shaft by the splines 24 on the drive shaft and corresponding grooves, not illustrated, in the bore of the sleeve 23. This sleeve has clutch formations, as indicated at 25 and 26, at its respectively opposite ends and the gears 21 and 22 are provided respectively with complementary clutch formations 27 and 28 so that, when the sleeve 23 is moved longitudinally of the shaft 18 to engage the complementary clutch formations 25 and 27 the pinion gear 21 will be drivenly connected to the drive shaft 18 and when the sleeve is moved longitudinally of the shaft to interconnect the complementary clutch formations 26 and 28 the pinion gear 21 will be released from its driving connection to the drive shaft and the pinion gear 22 will be drivenly connected to the drive shaft. When the sleeve 23 is in an intermediate position out of engagement with the clutch formations on both of the pinion gears the drive shaft 18 is free of the pinions 21 and 22 and the driving mechanism is then in a neutral condition. The sleeve 23 is moved longitudinally of the drive shaft by operator control means of any suitable construction including means providing an annular groove 29 extending around the sleeve 23 intermediate the length of the latter.

A transmission housing, generally indicated at 30, is mounted on the end of the gear housing 11 from which the drive shaft 18 projects in surrounding relationship to the drive shaft and a gas turbine housing, generally indicated at 31, is mounted on the end of the transmission housing 30 remote from the differential gear housing 11 and also in surrounding relationship to the drive shaft 18.

The gas turbine housing 31 includes a rotor chamber 32 of annular shape, an inlet scroll 33 of somewhat toroidal shape at one side of the rotor chamber 32 and an exhaust scroll 34, also of somewhat toroidal shape, at the other side of the rotor chamber. Turbine rotors 35, 36 and 37 are disposed in the rotor chamber 32 in side by side relationship to each other and each includes an inner disc or hub portion and a plurality of angular vanes or buckets, as indicated at 38, for the rotor 35, projecting radially from the peripheral surfaces of the corresponding disc or hub portions.

The rotor 36 is mounted at its center directly on the drive shaft 18 and, when driven, turns the drive shaft directly to provide a direct driving connection to the selected differential pinion gear 21 or 22.

Transmission mechanism is disposed in the transmission housing 30 between the gas turbine and the differential unit and this transmission mechanism includes a quill shaft or sleeve 40 surrounding the drive shaft 18 intermediate the length of the transmission housing and carrying on one end a fluid coupling rotor 41 turning in a fluid coupling stator 42, constituting the portion of the transmission nearest the gear housing 11 of the differential mechanism. At its other end the quill shaft 40 carries a planet gear cage 43 and adjacent the planet gear cage carries an annular brake drum 44. Planet gears, as indicated at 45, are carried by the cage 43 and a sun gear 46 is journalled on the drive shaft 18 and meshes with the planet gears 45. A ring gear 47 is mounted on and drivingly connected to the drive shaft 18 at the side of the sun gear 46 remote from the rotors and surrounds the planet gears 45. This ring gear has internal gear teeth meshing with the teeth of the planet gears which also mesh with the teeth of the sun gear 46.

The turbine rotor 37 has a centrally disposed hub 48 journalled on drive shaft 18 by the antifriction bearings 49 and this hub is drivingly connected to the sun gear 46.

With this arrangement, when the turbine rotor 37 is driven it drives the sun gear 46 which in turn revolves the planet gears 45 around the interior of the ring gear 47 mounted on the drive shaft 18. The fluid coupling rotor 41 frictionally resists rotation of the planet gear cage 43, with a frictional resistance which increases progressively as the speed of the rotor 41 relative to the stator 42 increases. With the drive shaft stationary and with the turbine rotor 37 driven, a turning effort will be applied to the drive shaft 18 through the planetary gear mechanism but the torque applied to this mechanism will feed back through the fluid coupling causing the fluid coupling rotor 41 to turn in the stator 42. As resistance to rotation of the fluid coupling rotor 41 increases an increasing amount of the power developed by the rotor 37 will be delivered to the drive shaft 18 until, after a predetermined time interval, the drive shaft will be turning at a speed proportional to the speed of the turbine rotor 37 by the speed reducing factor of the planetary mechanism. Brake shoes 48 are disposed within the brake drum 44 and, when the speed of the drive shaft 18 has been brought substantially up to the maximum speed which can be imparted thereto by the turbine rotor 37, these brake shoes are either manually or automatically engaged with the brake drum to lock the planet gear cage 43 against further feed back rotation through the fluid coupling at which time the drive shaft 18 will be positively driven by the turbine rotor 37 at the speed determined by the speed reduction ratio of the planetary gear mechanism.

When the rotor 37 has brought the drive shaft up to a predetermined speed and the planet gear cage has been locked as described above, most of the load is then shifted to the turbine rotor 36 which is directly connected to the drive shaft, the power delivered to the drive shaft being at all times the sum of the efforts of the rotors 37 and 36. A third range of speed can be provided by locking the planet gear cage 47 at a very low speed of the rotor 37 thereby slowing the speed of this rotor down to a value at which it produces its maximum torque, the torque developed by a gas turbine rotor from the same quantity and speed of gas flow thereby being inversely proportional to the rotor speed.

A stub shaft 50 extends longitudinally from the end of the drive shaft 18 at which the rotors 36 and 37 are connected to the drive shaft substantially coaxially of the drive shaft and is journalled in a bearing 51 carried by the turbine housing. The rotor 35 is directly mounted on the stub shaft 50 and a beveled gear 52 is mounted on the shaft 50 at the outer side of the turbine housing.

An air compressor or supercharger housing, generally indicated at 53, is mounted on the turbine housing at one side of and substantially at right angles to the turbine housing and includes a compressor impeller chamber 54, an outlet scroll 55 which opens directly into the inlet scroll 33 of the turbine housing 30, and inlet formations 56 and 57. An air compressor impeller shaft 58 is disposed perpendicular to the stub shaft 50 and journaled in the air compressor housing 53 by the bearings 60 and 61 and a beveled gear 62 is mounted on the impeller shaft 58 and meshes with the beveled gear 52 so that the impeller shaft is driven by the turbine rotor 35 through the stub shaft 50 and the beveled gears 52 and 62.

A double-faced radial flow impeller 63 is disposed within the impeller chamber 54 of the compressor housing 53 and takes air at one side from the air inlet 56 and at its other side from the air inlet 57, discharging all of the air at an increased pressure into the outlet scroll 55 of the compressor housing.

The exhaust scroll 34 of the turbine housing is connected through a bypass conduit 65 with the compressor intake structure 57 and an exhaust pipe 66 leads from the formation 57, this formation being closed except for the opening of the bypass 65 and exhaust pipe 66 into it and the opening of the intake formation into the adjacent side of the impeller 63.

A control valve 67 is disposed in the exhaust pipe 66 and is controlled through suitable linkage mechanism 68 from an exhaust direction detection vane 69 mounted in the turbine exhaust scroll 34 near the exhaust side of the rotor 35.

With this arrangement, a controlled quantity of exhaust gas from the turbine will be forced by the impeller 63 into the impeller outlet scroll 55 at an increased pressure and at the same time a quantity of fresh air from the compressor inlet 56 will be forced by the impeller from the inlet 56 into the outlet scroll 55 at increased pressure and mixed with the exhaust gas mentioned above.

Fuel nozzles, as indicated at 70, are mounted in the housing wall of the impeller chamber 54 of the compressor housing at the exhaust gas intake side of the impeller and inwardly of the periphery of the impeller so that the fuel discharged by these nozzles is discharged into a flowing stream of exhaust gas which will not support combustion. This flow of the exhaust gas past the fuel nozzles carries the fuel away from the nozzles and keeps the flame from the nozzles so that the nozzles do not become fouled or clogged by having the flame flash back and burn too close to the fuel nozzles. The nozzles are preferably distributed at substantially equal angular intervals around the annular wall of the impeller chamber 54 and are fed from a fuel pump 71 driven by the impeller shaft 58. A fuel igniter 72 is mounted in the wall of the combustion chamber 73 where the compressor scroll 55 and turbine inlet scroll 33 are connected together and ignition takes place in this combustion chamber, the flame being carried around the turbine inlet scroll 53 and the products of combustion forced from the inlet scroll to the turbine rotors 35, 36, and 37 through the directional vanes 74 disposed in the annular opening between the inlet scroll 33 and the rotor chamber 32.

The feed-back of the exhaust gas through the compressor impeller not only has the beneficial effect of keeping the flame away from the fuel nozzles so that these nozzles do not have to be serviced but also adds to the combustible charge in the combustion chamber 73 any unburned fuel remaining in the exhaust gas thereby materially increasing the economy of the engine. Particularly, when the engine is rotating at low speed under heavy load, most of the high velocity exhaust gas from the turbine under these conditions will be sent back through the air compressor and back to the turbine without substantial loss of pressure thereby saving a large portion of the kinetic energy as well as any thermal energy remaining in the exhaust gas.

It will be noted that the compressor impeller 63 is driven independently by the turbine rotor 35 so that this impeller will be continuously driven at its own speed regardless of the speed imparted to the axles 16 and 17 by the turbine rotors 36 and 37.

A starter 75 is mounted in a housing 76 enclosing the beveled gears 52 and 62 and, when operating, is drivingly connected to the stub shaft 50 to turn this shaft and the compressor impeller shaft 58 to start the compressor and supply propelling gas to the turbine rotor 35. As soon as the rotor 35 becomes gas driven the engine is in operation and its power can be applied to the drive axle by selective operation of the clutch sleeve 25.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A vehicle drive assembly comprising a differential mechanism including a housing and a drive shaft extending out of said housing, a transmission housing mounted on said differential housing in surrounding relationship to said drive shaft, a turbine housing mounted on said transmission housing in spaced relationship to said differential housing, transmission mechanism in said transmission housing drivingly connected to said drive shaft, a supercharger shaft disposed at an angle to said drive shaft, turbine rotors in said turbine housing drivingly connected respectively to said drive shaft, said transmission mechanism and said supercharger shaft, said turbine housing including an inlet scroll disposed at one side and an exhaust scroll disposed at the opposite side of said turbine rotors, a supercharger impeller on said supercharger shaft, a supercharger housing surrounding said impeller and having an intake formation and an outlet scroll connected to the inlet scroll of said turbine housing, and means connecting the exhaust scroll of said turbine housing to the inlet formation of said supercharger housing to feed a portion of the exhaust gases from said turbine back to the inlet of said turbine through said supercharger.

2. A gas turbine power plant comprising a drive shaft, a transmission housing surrounding said drive shaft, transmission mechanism in said housing drivingly connected to said drive shaft, a turbine housing connected to said transmission housing in surrounding relationship to said drive shaft and including an inlet scroll, an outlet scroll and a rotor chamber between said inlet and outlet scrolls, a stub shaft journaled in said turbine chamber coaxially of said drive shaft, turbine rotors disposed in said rotor chamber for coaxial rotation and drivingly connected one to said drive shaft, one to said transmission mechanism and one to said stub shaft for driving said drive shaft at different speeds and driving said stub shaft independently of said drive shaft, an impeller shaft drivenly connected to said stub shaft with its rotational axis at an angle to the common rotational axis of said drive shaft and said stub shaft, a double intake air compressor impeller mounted on said impeller shaft, an air compressor housing surrounding said impeller shaft and said impeller and having intake formations disposed at respectively opposite sides of said impeller in surrounding relationship to said impeller shaft and an outlet scroll surrounding said impeller and connected to the inlet scroll of said turbine housing, said supercharger housing outlet scroll providing a combustion chamber at the location at which it is joined to said turbine housing inlet scroll, fuel ignition means in said combustion chamber, conduit means connecting the outlet scroll of said turbine housing to one of the intake formations of said air compressor housing, fuel injection nozzles mounted in the side of said air compressor housing adjacent said one intake formation, a fuel pump driven by the turbine and connected to said fuel injection nozzles for forcing fuel through said nozzles into said air compressor housing, and means connected with said one intake formation regulating the quantity of exhaust gas fed from said turbine housing outlet scroll into said air compressor housing under different operating conditions of said turbine.

3. A gas turbine power plant comprising a drive shaft, a transmission housing surrounding said drive shaft, transmission mechanism in said housing drivingly connected to said drive shaft, a turbine housing connected to said transmission housing in surrounding relationship to said drive shaft and including an annular inlet chamber, an annular outlet chamber and a rotor chamber between said inlet and outlet chambers, an air compressor housing including an impeller chamber, intake formations disposed at respectively opposite sides of said impeller chamber and an annular outlet chamber surrounding said impeller chamber and pneumatically connected to the inlet chamber of said turbine housing, an impeller shaft journaled in said air compressor housing, a double intake impeller mounted on said impeller shaft within said impeller chamber, turbine rotors disposed in said rotor chamber and drivingly connected respectively to said drive shaft, said transmission mechanism and said impeller shaft, conduit means pneumatically connecting the outlet chamber of said turbine housing to one of the intake formations of said air compressor housing, means connected to said one intake formation regulating the amount of turbine exhaust gas fed to said air compressor, fuel injection means connected to said impeller chamber at the side of said impeller adjacent said one intake formation, and fuel igniting means in the outlet chamber of said air compressor housing.

4. A gas turbine power plant comprising a drive shaft, a transmission housing surrounding said drive shaft, transmission mechanism in said housing drivingly connected to said drive shaft, a turbine housing connected to said transmission housing in surrounding relationship to said drive shaft and including an annular inlet chamber, an annular outlet chamber and a rotor chamber between said inlet and outlet chambers, an air compressor housing including an impeller chamber, intake formations disposed at respectively opposite sides of said impeller chamber and an annular outlet chamber surrounding said impeller chamber and pneumatically connected to the inlet chamber of said turbine housing, an impeller shaft journaled in said air compressor housing, a double intake impeller mounted on said impeller shaft within said impeller chamber, turbine rotors disposed in said rotor chamber and drivingly connected respectively to said drive shaft, said transmission mechanism and said impeller shaft, conduit means pneumatically connecting the outlet chamber of said turbine housing to one of the intake formations of said air compressor housing, means connected to said one intake formation regulating the amount of turbine exhaust gas fed to said air compressor, fuel injection means connected to said impeller chamber at the side of said impeller adjacent said one intake formation, fuel igniting means in the outlet chamber of said air compressor housing, a differential housing connected to said transmission housing in surrounding relationship to said drive shaft, differential mechanism in said differential housing, and means carried by said drive shaft selectively connecting said drive shaft to said differential mechanism for rotation of the latter in opposite directions.

NILS W. HAMMAREN.

References Cited in the file of this patent

UNITED STATES PATENTS

| Number | Name | Date |
|---|---|---|
| 2,168,726 | Whittle | Aug. 8, 1939 |
| 2,404,275 | Clark | July 16, 1946 |
| 2,474,068 | Sammons | June 21, 1949 |
| 2,619,797 | Haworth | Dec. 2, 1952 |
| 2,625,006 | Lundquist | Jan. 13, 1953 |
| 2,631,427 | Rainbow | Mar. 17, 1953 |